US010029607B2

(12) United States Patent
Kim et al.

(10) Patent No.: US 10,029,607 B2
(45) Date of Patent: Jul. 24, 2018

(54) VEHICLE HEAD LAMP DRIVING APPARATUS AND VEHICLE PROVIDED WITH SAME

(71) Applicant: LG ELECTRONICS INC., Seoul (KR)

(72) Inventors: Sungmin Kim, Seoul (KR); Younsun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/502,272

(22) PCT Filed: Aug. 6, 2015

(86) PCT No.: PCT/KR2015/008255
§ 371 (c)(1),
(2) Date: Feb. 7, 2017

(87) PCT Pub. No.: WO2016/021961
PCT Pub. Date: Feb. 11, 2016

(65) Prior Publication Data
US 2017/0225611 A1    Aug. 10, 2017

(30) Foreign Application Priority Data

Aug. 7, 2014  (KR) ........................ 10-2014-0101890

(51) Int. Cl.
*B60Q 1/02* (2006.01)
*B60Q 1/14* (2006.01)
(Continued)

(52) U.S. Cl.
CPC ............ *B60Q 1/1423* (2013.01); *B60K 35/00* (2013.01); *B60Q 1/16* (2013.01); *F21S 41/13* (2018.01);
(Continued)

(58) Field of Classification Search
CPC ...... B60Q 1/16; B60Q 1/1423; B60Q 1/2696; F21S 48/1145; F21S 48/1154
(Continued)

(56) References Cited

U.S. PATENT DOCUMENTS 7,755,294 B2    7/2010 Shelton
8,941,260 B2 *  1/2015 Fujiwara .............. B60Q 1/0023
307/10.1
(Continued)

FOREIGN PATENT DOCUMENTS

EP    1 977 929 B1    5/2012
JP    2001-001832     1/2001
(Continued)

OTHER PUBLICATIONS

International Search Report dated Dec. 14, 2015, for PCT/KR2015/008255, with English Translation, 6 pages.

Primary Examiner — Tung X Le
(74) Attorney, Agent, or Firm — Fish & Richardson P.C.

(57) ABSTRACT

The present invention relates to a vehicle head lamp driving apparatus and a vehicle provided with the same. The vehicle head lamp driving apparatus of the present invention comprises: a light output unit to output structured visible light to the front of a vehicle; a light receiving unit to receive reception light corresponding to the structured visible light; and a processor to calculate a distance to and a location of an object positioned in front of the vehicle, on the basis of the received reception light and structured visible light, wherein the light output unit comprises: a laser diode to output structured visible light having a first color; a light conversion unit for converting, into structured visible light having second and third colors, at least a part of the structured visible light having the first color; and a light diffusing unit for diffusing and outputting the structured visible light having the first to third colors to the front of the (Continued)

vehicle. Therefore, the distance to the object in front of the vehicle can be detected on the basis of visible light.

15 Claims, 14 Drawing Sheets

(51) Int. Cl.

| | |
|---|---|
| *B60K 35/00* | (2006.01) |
| *F21S 8/10* | (2006.01) |
| *B60Q 1/16* | (2006.01) |
| *F21S 41/60* | (2018.01) |
| *F21S 41/14* | (2018.01) |
| *F21S 41/13* | (2018.01) |
| *B60W 10/04* | (2006.01) |
| *B60W 10/18* | (2012.01) |
| *B60W 10/20* | (2006.01) |
| *B60W 10/22* | (2006.01) |
| *B60W 10/30* | (2006.01) |

(52) U.S. Cl.
CPC .............. *F21S 41/14* (2018.01); *F21S 41/60* (2018.01); *F21S 48/1136* (2013.01); *F21S 48/1145* (2013.01); *F21S 48/17* (2013.01); *B60K 2350/106* (2013.01); *B60K 2350/1024* (2013.01); *B60K 2350/1072* (2013.01); *B60K 2350/1084* (2013.01); *B60K 2350/2052* (2013.01); *B60K 2350/921* (2013.01); *B60Q 2300/056* (2013.01); *B60Q 2300/42* (2013.01); *B60W 10/04* (2013.01); *B60W 10/18* (2013.01); *B60W 10/20* (2013.01); *B60W 10/22* (2013.01); *B60W 10/30* (2013.01)

(58) Field of Classification Search
USPC ..................................... 315/77, 82
See application file for complete search history.

(56) References Cited

U.S. PATENT DOCUMENTS

| | | | | |
|---|---|---|---|---|
| 2005/0168151 | A1* | 8/2005 | Shaffer | ..................... B60R 1/00 |
| | | | | 315/82 |
| 2006/0227302 | A1 | 10/2006 | Harbers | |
| 2007/0285019 | A1* | 12/2007 | Katoh | .................. B60Q 1/1423 |
| | | | | 315/82 |
| 2008/0055896 | A1* | 3/2008 | Feldmeier | .......... H05B 33/0872 |
| | | | | 362/231 |
| 2008/0246404 | A1 | 10/2008 | Shelton | |
| 2008/0298077 | A1 | 12/2008 | Naganawa | |
| 2010/0214791 | A1 | 8/2010 | Schofield | |
| 2011/0205521 | A1 | 8/2011 | Mimeault | |
| 2012/0026325 | A1* | 2/2012 | Bunker | .................. G03B 11/00 |
| | | | | 348/143 |
| 2013/0235201 | A1* | 9/2013 | Kiyohara | ............ G06K 9/00805 |
| | | | | 348/148 |
| 2015/0323144 | A1* | 11/2015 | Naka | .................... G03B 21/204 |
| | | | | 362/19 |

FOREIGN PATENT DOCUMENTS

| | | |
|---|---|---|
| JP | 2001-277938 | 10/2001 |
| JP | 2002-019517 | 1/2002 |
| JP | 2004-340890 | 12/2004 |

\* cited by examiner

VEHICLE HEAD LAMP DRIVING APPARATUS AND VEHICLE PROVIDED WITH SAME

CROSS REFERENCE TO RELATED APPLICATIONS

This application is a U.S. National Phase Application under 35 U.S.C. § 371 of International Application PCT/KR2015/008255 filed on Aug. 6, 2015, which claims the benefit of Korean Application No. 10-2014-0101890, filed on Aug. 7, 2014, the entire contents of which are hereby incorporated by reference in their entireties.

TECHNICAL FIELD

The present disclosure relates to an apparatus for driving a vehicle head lamp and a vehicle having the same, and more particularly, to an apparatus for driving a vehicle head lamp and a vehicle having the same, which can calculate the distance to an object ahead of the vehicle based on visible light.

BACKGROUND ART

A vehicle is a device carrying a passenger in a desired direction. For example, the vehicle is a car.

To promote the convenience of vehicle users, vehicles have been equipped with various sensors and electronic devices. Particularly, various devices are developed to increase the driving convenience of users. In the context, lots of functions are provided to a vehicle head lamp.

DISCLOSURE

Technical Problem

An object of the present disclosure is to provide an apparatus for driving a vehicle head lamp and a vehicle having the same, which can calculate the distance to an object ahead of the vehicle based on visible light.

Technical Solution

In an aspect of the present invention, an apparatus for driving a vehicle head lamp includes a light output unit to output structured visible light ahead of a vehicle, a light receiving unit to receive reception light corresponding to the structured visible light, and a processor to calculate a distance and position of an object ahead of the vehicle based on the received reception light and the structured visible light. The light output unit includes a laser diode to output structured visible light of a first color, a light converter to convert at least part of the structured visible light of the first color to structured visible light of a second color and a third color, and a light diffuser to diffuse the structured visible light of the first, second, and third colors ahead of the vehicle.

In another aspect of the present invention, an apparatus for driving a vehicle head lamp includes a first light output unit to output structured visible light ahead of a vehicle, a second light output unit to output infrared light, a light receiving unit to receive first reception light corresponding to the structured visible light or second reception light corresponding to the infrared light, and a processor to calculate a distance and position of an object ahead of the vehicle based on the received first reception light and the structured visible light, or based on the received second reception light and the infrared light.

In another aspect of the present invention, a vehicle includes a steering driver to drive a steering apparatus, a brake driver to drive a brake apparatus, a power source driver to drive a power source, a light output unit to output structured visible light ahead of the vehicle, a light receiving unit to receive reception light corresponding to the structured visible light, and a processor to calculate a distance and position of an object ahead of the vehicle based on the received reception light and the structured visible light. The light output unit includes a laser diode to output structured visible light of a first color, a light converter to convert at least part of the structured visible light of the first color to structured visible light of a second color and a third color, and a light diffuser to diffuse the structured visible light of the first, second, and third colors ahead of the vehicle.

Advantageous Effects

In an apparatus for driving a vehicle head lamp and a vehicle having the same according to an embodiment of the present disclosure, structured visible light is output through a head lamp and reflected or scattered from an external structure or object. Then, reception light corresponding to the structured visible light is received through the head lamp. The distance to the external structure or object is calculated based on the difference, phase difference, level difference, or the like between the output structured visible light and the received reception light. Therefore, the distance to an object ahead of the vehicle may be calculated easily.

If visible light is output through a plurality of head lamps, at least one of an output direction, an output distance, and an output intensity of the structured visible light may be changed, thereby avoiding dazzling a driver on the other side of a road and enabling a driver of the vehicle to view a remote object with the naked eye.

Since at least one of the output direction, output distance, and output intensity of the structured visible light may be changed based on a steering direction change signal of the vehicle, the convenience of the driver may be increased.

It is also possible to change the intensity of the structured visible light according to an ambient illuminance of the vehicle or to set at least one of the output direction, output distance, and output intensity of the structured visible light based on data received through a communication unit. Therefore, the use convenience of the driver may be increased.

An apparatus for driving a vehicle head lamp and a vehicle having the same according to another embodiment of the present disclosure include a first light output unit to output structured visible light ahead of the vehicle, a second light output unit to output infrared light, and a light receiving unit to receive first reception light corresponding to the structured visible light or second reception light corresponding to the infrared light. Accordingly, the distance to an external structure or object is calculated in the daytime as well as at night. As a consequence, the distance to an object ahead of the vehicle may be calculated easily.

BRIEF DESCRIPTION OF THE DRAWINGS

FIG. 8b is an exemplary view illustrating detection of an object in the processor illustrated in FIG. 8a.

BEST MODE FOR CARRYING OUT THE INVENTION

With reference to the attached drawings, the present disclosure will be described in detail.

Postfixes appended to the names of components in the following description, 'module' and 'unit' are assigned only in consideration of the convenience of the present disclosure, not having any special important meanings or roles. Therefore, 'module' and 'unit' may be interchangeably used with each other.

The term 'vehicle' used in the present disclosure may cover a car and a motorbike in concept. The following description is given with the appreciation that a vehicle is a car, by way of example.

In the present disclosure, a vehicle may be any of a vehicle equipped with an engine as a power source, a hybrid vehicle equipped with an engine and an electrical motor as power sources, an electric vehicle equipped with an electrical motor as a power source, and so on.

Figure 1:
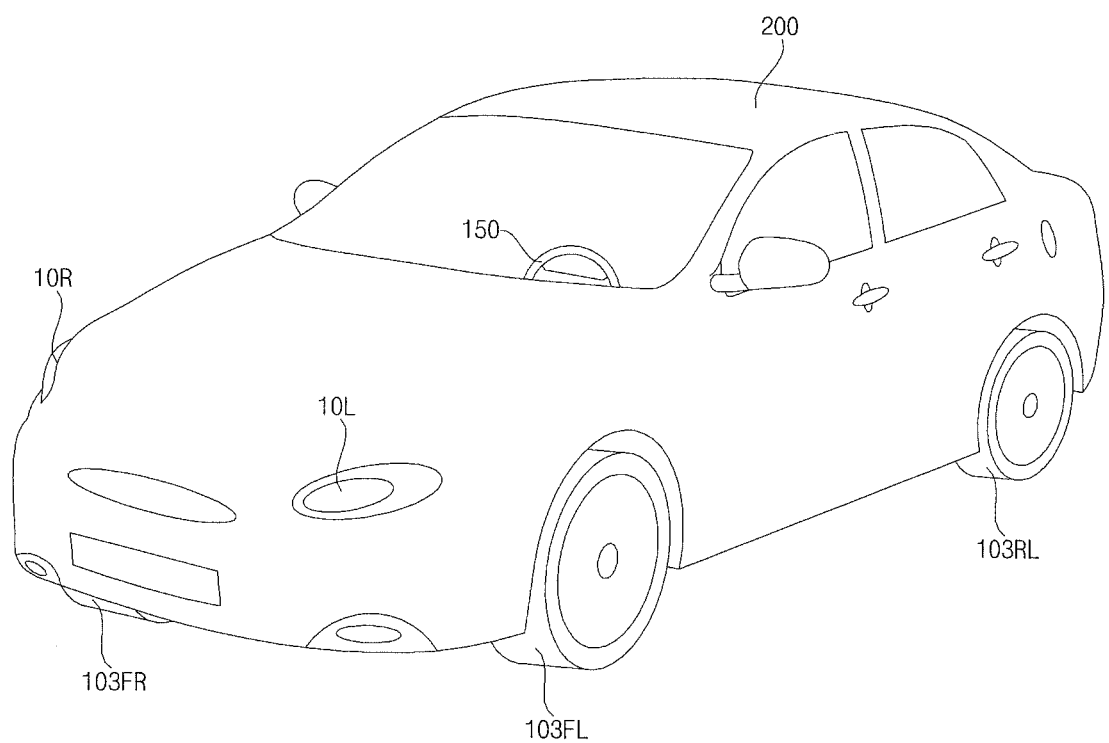
FIG. 1 is a view illustrating the exterior of a vehicle having a vehicle head lamp according to an embodiment of the present disclosure.

FIG. 1 is a view illustrating the exterior of a vehicle having a vehicle head lamp according to an embodiment of the present disclosure.

Referring to FIG. 1, a vehicle 200 may include wheels 103FR, 103FL, 103RL, . . . which are rotated by a power source, a handle 150 for controlling a traveling direction of the vehicle 200, and a plurality of head lamps 10L and 10R installed to the vehicle 200.

Particularly, each of the head lamps 10L and 10R may include a light output unit (50 in FIG. 4) for outputting structured visible light ahead of the vehicle 200, and a light receiving unit (70 in FIG. 4) for receiving reception light corresponding to the structured visible light.

In an embodiment of the present disclosure, structured visible light is output through the head lamps 10L and 10R and reflected or scattered from an external structure or object, and reception light corresponding to the structured visible light is received through the head lamps 10L and 10R. The distance to the external structure or object is calculated based on the difference, phase difference, level difference, or the like between the output structured visible light and the received reception light. Accordingly, the distance to an object ahead of the vehicle 200 may be calculated easily.

If visible light is output through the plurality of head lamps 10L and 10R, at least one of an output direction, output distance, and output intensity of the structured visible light may be changed.

For example, in order to prevent dazzling of a driver on the other side of a road, the output direction or distance of the visible light may be changed or the output intensity of the visible light may be reduced, based on a calculated distance.

In another example, in order to enable a driver to view a remote object with the naked eye, the output distance or output intensity of the visible light may be increased, based on the calculated distance.

At least one of the output direction, output distance, and output intensity of the structured visible light may be changed based on a steering direction change signal of the vehicle 200.

It is possible to change the intensity of the structured visible light according to an ambient illuminance of the vehicle 200. For example, as the illuminance gets smaller, that is, as it gets darker around the vehicle 200, it is possible to increase the intensity of the structured visible light.

Further, it is possible to set at least one of the output direction, output distance, and output intensity of the structured visible light based on data received through a communication unit.

Meanwhile, each of the head lamps 10L and 10R may further include a second light output unit 60 for outputting infrared (IR) light.

Accordingly, the distance to an external structure or object may be calculated at night as well as in the daytime by outputting structured visible light at night and IR light in the daytime. Consequently, the distance to an object ahead of the vehicle 200 may be calculated easily.

Figure 2:
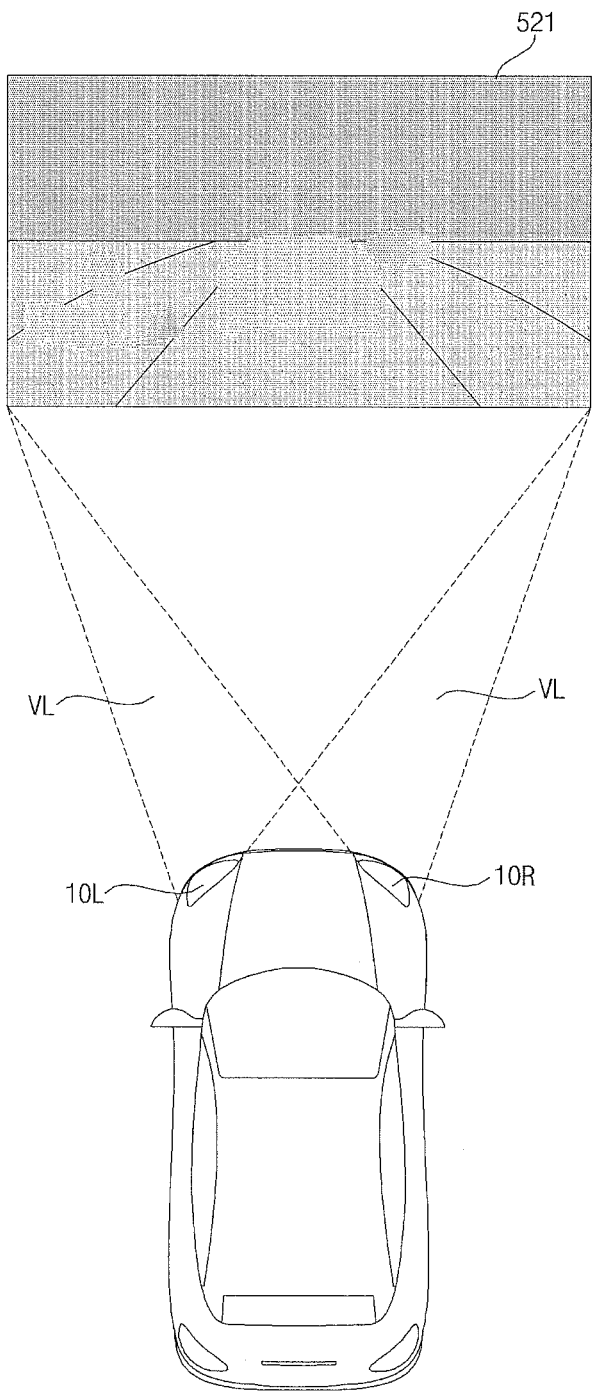
FIG. 2 is an exemplary view illustrating output of visible light from a head lamp during traveling of a vehicle at night.

FIG. 2 is an exemplary view illustrating output of visible light from a head lamp during traveling of a vehicle at night.

Referring to FIG. 2, the plurality of head lamps 10L and 10R of the vehicle 200 may output structured visible light VL ahead of the vehicle 200 as indicated by reference numeral 521 during traveling at night.

The structured visible light VL is configured by modulating a signal and adding the modulated signal to visible light. The structured visible light VL may be output through the light output unit (50 in FIG. 4). Meanwhile, the added signal may correspond to a driving signal.

The light receiving unit (50 in FIG. 4) may distinguish external natural light from reception light corresponding to the structured visible light by the above signal modulation.

An apparatus for driving a vehicle head lamp (100 in FIG. 4) calculates the distance to an external structure or object based on the difference, phase difference, level difference, or the like between the output structured visible light and the received reception light. Therefore, the distance to the object ahead of the vehicle 200 may be calculated easily.

Figure 3:
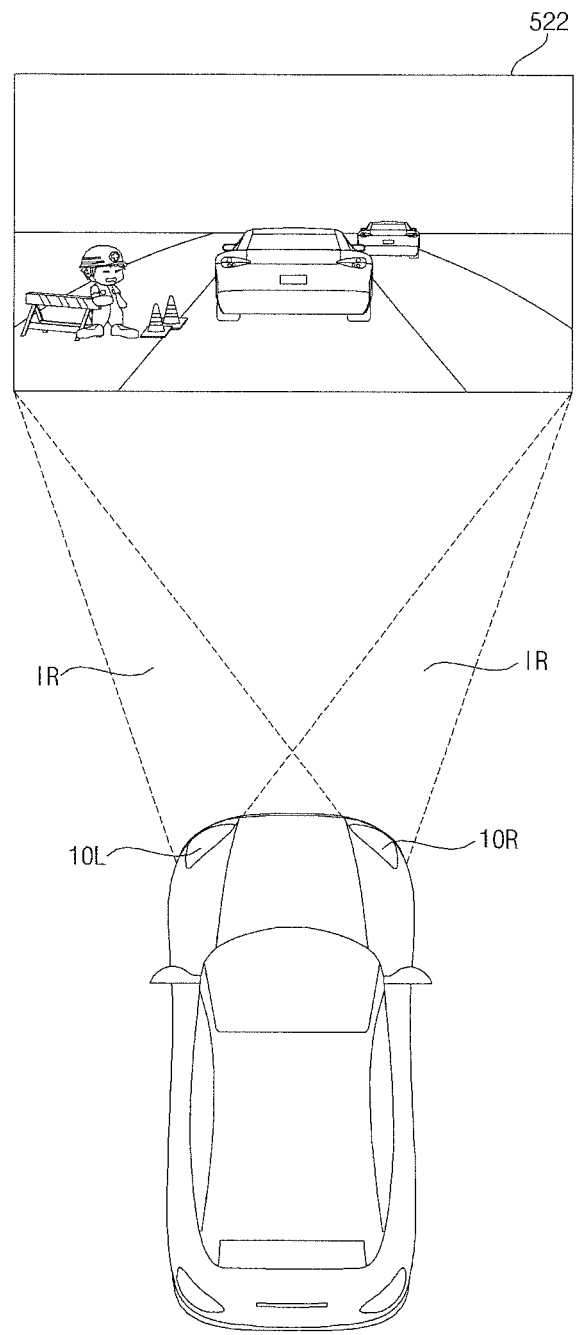
FIG. 3 is an exemplary view illustrating output of infrared light from a head lamp during traveling of a vehicle in the daytime.

FIG. 3 is an exemplary view illustrating output of IR light from a head lamp during traveling of a vehicle in the daytime.

Referring to FIG. 3, the plurality of head lamps 10L and 10R of the vehicle 200 may output IR light, IR ahead of the vehicle 200 as indicated by reference numeral 522 during traveling in the daytime.

The IR light, IR may be output through the second light output unit 60. The IR light, IR may be structured IR light like visible light, or may not be structured IR light.

The light receiving unit (50 in FIG. 4) may receive second reception light corresponding to the IR light. Particularly, if the IR light is structured IR light, the light receiving unit (50 in FIG. 4) may distinguish external IR light from the second reception light.

The apparatus for driving a vehicle head lamp (100 in FIG. 4) calculates the distance to an external structure or object based on the difference, phase difference, level difference, or the like between the output IR light and the received second reception light. Therefore, the distance to the object ahead of the vehicle may be calculated easily.

Particularly, since IR light, instead of visible light, is output through the head lamps 10L and 10R during traveling of the vehicle in the daytime, the distance to an object ahead of the vehicle may be calculated easily without dazzling a driver of another vehicle or a pedestrian ahead of the vehicle.

Figure 4:
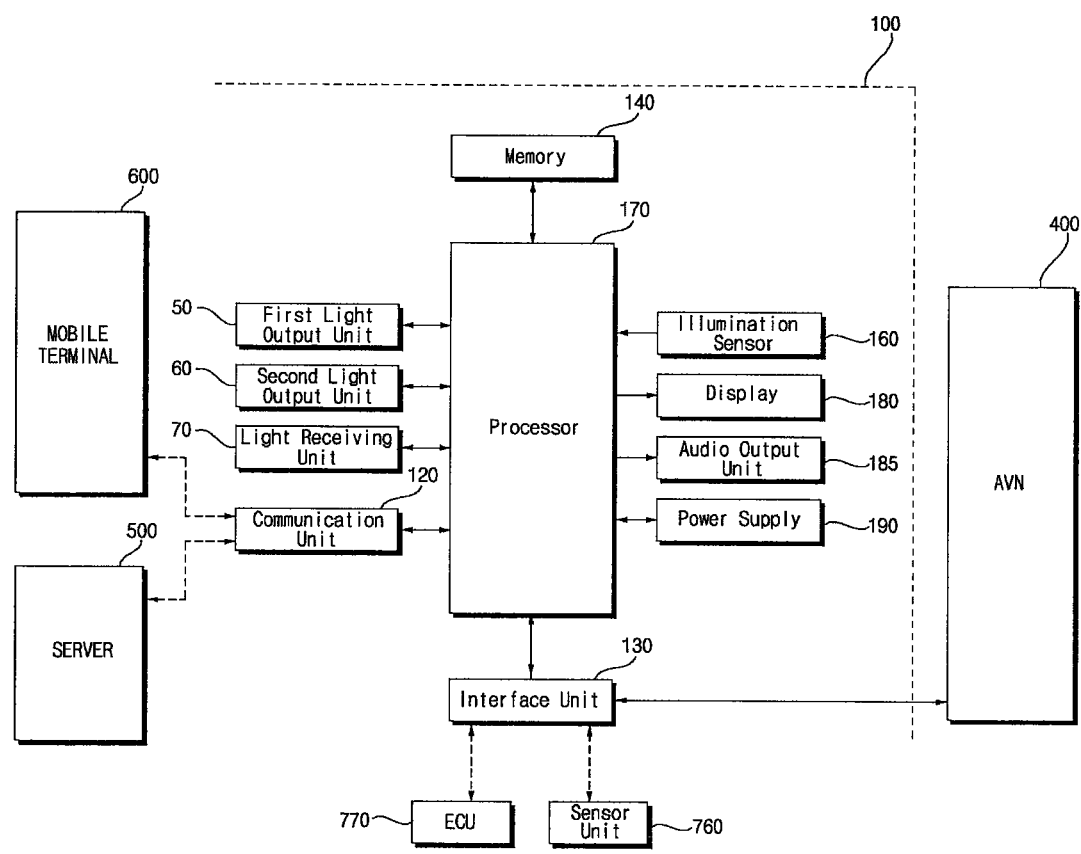
FIG. 4 is an interior block diagram of an apparatus for driving a vehicle head lamp according to an embodiment of the present disclosure.

FIG. 4 is an interior block diagram of an apparatus for driving a vehicle head lamp according to an embodiment of the present disclosure.

Referring to FIG. 4, the apparatus 100 for driving a vehicle head lamp may include the light output unit 50 for outputting structured visible light ahead of the vehicle, the light receiving unit 70 for receiving reception light corresponding to the structured visible light, and a processor 170 for calculating the distance and position of an object ahead of the vehicle based on the received reception light and the structured visible light. The apparatus 100 may further include the second light output unit 60 for outputting IR light.

Meanwhile, the apparatus 100 for driving a vehicle head lamp may include a communication unit 120, an interface unit 130, a memory 140, an illumination sensor 160, the processor 170, a display 180, an audio output unit 185, and a power supply 190. The apparatus 100 may further include an audio input unit (not shown).

The first light output unit 50 outputs structured visible light ahead of the vehicle. For this purpose, the first light output unit 50 may include a laser diode 52 for outputting structured visible light of a first color, a light converter 54 for converting at least part of the structured visible light of the first color into structured visible light of second and third colors, and a light diffuser 56 for diffusing the structured visible light of the first, second, and third colors ahead of the vehicle. The light diffuser 56 may include a scanner (57 in FIG. 6) for performing first-direction scanning and second-direction scanning to the outside.

The first light output unit 50 may further include a laser driver (51 in FIG. 6) for driving the laser diode 52.

The second light output unit 60 may output IR light. For this purpose, the second light output unit 60 may include a laser diode 62 for outputting IR light. The IR light may be output to the outside through the scanner (57 in FIG. 60) of the first light output unit 50 by first-direction scanning and second-direction scanning.

The light receiving unit 70 may receive first reception light corresponding to structured visible light or second reception light corresponding to IR light. Particularly, the light receiving unit 70 may receive the first reception light corresponding to the structured visible light at night or the second reception light corresponding to the IR light in the daytime.

For this purpose, the light receiving unit 70 may include an IR blocking filter (72 in FIG. 5b) and a light detector (74 in FIG. 5b) for converting reception light passed through the IR blocking filter to an electrical signal. The electrical signal converted by the light detector (74 in FIG. 5b) may be input to the controller 170.

The communication unit 120 may exchange data wirelessly with a mobile terminal 600 or a server 500. Particularly, the communication unit 120 may exchange data wirelessly with a mobile terminal of a vehicle driver. For wireless data communication, various data communication schemes are available, such as Bluetooth, wireless fidelity direct (WiFi Direct), wireless fidelity (WiFi), and automotive pixel link (ApiX).

The communication unit 120 may receive, from the mobile terminal 600 or the server 500, weather information and traffic information about a road such as transport protocol expert group (TPEG) information. The apparatus 100 for driving a vehicle head lamp may transmit real-time traffic information detected based on images to the mobile terminal 600 or the server 500.

If a user is aboard on the vehicle, the mobile terminal 600 of the user and the apparatus 100 for driving a vehicle head lamp may be paired with each other, automatically or upon user execution of an application.

Meanwhile, the communication unit 120 may receive, from the mobile terminal 600 of the user or the like, a light output unit operation signal for outputting structured visible light or a signal for setting at least one of an output direction, output distance, and output intensity of the structured visible light. The received signal may be input to the processor 170.

The interface unit 130 may receive vehicle-related data or transmit a signal processed or generated by the processor 170 to the outside. For this purpose, the interface unit 130 may conduct data communication with an electronic control unit (ECU) 770, an audio video navigator (AVN) 400, a sensor unit 760, and so one in the vehicle according to a wired or wireless communication scheme.

The interface unit 130 may receive map information related to vehicle traveling from the AVN 400 by data communication.

Meanwhile, the interface unit 130 may receive sensor information from the ECU 770 or the sensor unit 760.

The sensor information may include at least one of vehicle direction information, vehicle position information (Global Positioning System (GPS) information), vehicle angle information, vehicle speed information, vehicle acceleration information, vehicle inclination information, vehicle forwarding/backwarding information, battery information, fuel information, tire information, vehicle lamp information, vehicle internal temperature information, and vehicle internal humidity information.

Among the sensor information, information related to vehicle traveling such as vehicle direction information, vehicle position information, vehicle angle information, vehicle speed information, and vehicle inclination information may be referred to as vehicle traveling information.

The memory 140 may store various data for overall operations of the apparatus 100 for driving a vehicle head lamp, such as a program for processing or controlling by the processor 170.

The illumination sensor 160 may sense an ambient illuminance of the vehicle. Particularly, the illumination sensor 160 may sense an ambient illuminance ahead of the vehicle. The sensed ambient illuminance is indicated to the processor 170.

The audio input unit (not shown) may receive a user voice. For this purpose, the audio input unit may include a microphone. The received voice may be converted to an electrical signal and provided to the processor 170.

The processor 170 provides overall control to each unit of the apparatus 100 for driving a vehicle head lamp.

The processor 170 may calculate the distance and position of an object ahead of the vehicle based on structured visible light output from the light output unit 50 and structured visible light received by the light receiving unit 70.

Particularly, the processor 170 may calculate the distance to an external structure or object based on the difference, phase difference, level difference, or the like between the output structured visible light and the received reception light. Accordingly, the distance to an object ahead of the vehicle may be calculated easily.

Specifically, the processor 170 may generate a disparity map of a space ahead of the vehicle based on the phase difference between the received reception light and the structured visible light, and calculate the distance and position of an object ahead of the vehicle based on the disparity map.

If the light output unit 50 outputs structured visible light, the processor 170 may change at least one of an output direction, output distance, and output intensity of the structured visible light.

For example, the processor 170 may change the output direction or output distance of the visible light or decrease the output intensity of the visible light based on a calculated distance in order to prevent dazzling of a driver on the other side of a road.

In another example, in order to enable the driver to view a remote object with the naked eye, the processor 170 may increase the output distance or output intensity of the visible light, based on the calculated distance.

If the light output unit 50 includes the scanner 57 for outputting structured visible light to the outside by scanning, the processor 170 may change the output direction of the structured visible light or the output intensity of the structured visible light output from the light output unit 50 by adjusting a scanning direction of the scanner 57 based on the distance and position of an object ahead of the vehicle.

The processor 170 may change the intensity of the structured visible light output from the light output unit 50 according to an illuminance sensed by the illumination sensor 160 that senses an ambient illuminance of the vehicle. For example, as the sensed illuminance is lower, the processor 170 may control the light output unit 50 to increase the intensity of the visible light.

The processor 170 may change at least one of the output direction, output distance, and output intensity of the structured visible light based on a steering direction change signal of the vehicle.

The processor 170 may also change the intensity of the structured visible light according to an ambient illuminance of the vehicle. For example, as the illuminance gets smaller, that is, as it gets darker around the vehicle 200, the processor 170 may increase the intensity of the structured visible light.

Further, the processor 170 may set at least one of the output direction, output distance, and output intensity of the structured visible light based on data received through the communication unit 120.

Each of the head lamps 10L and 10R may further include the second light output unit 60 for outputting IR light.

Accordingly, the distance to an external structure or object may be calculated at night as well as in the daytime by outputting structured visible light at night and IR light in the daytime. Consequently, the distance to an object ahead of the vehicle may be calculated easily.

Particularly, the processor 170 may calculate the distance and position of an object ahead of the vehicle based on the received first reception light and the structured visible light, or based on the received second reception light and the IR light.

If the first light output unit 50 includes the scanner 57 for outputting the structured visible light and the IR light to the outside by scanning, the processor 170 may change the output direction of at least one of the structured visible light and the IR light or the intensity of the structured visible light output from the light output unit 50 by controlling a scanning direction of the scanner 57 based on the distance and position of an object ahead of the vehicle.

The processor 170 may generate a disparity map of a space ahead of the vehicle based on the phase difference between the received reception light and the structured visible light or the phase difference between the received second reception light and the output IR light, calculate the distance and position of an object ahead of the vehicle based on the disparity map, and continuously track movement of the object after detecting the object.

Particularly, the processor 170 may detect the object by lane detection, vehicle detection, pedestrian detection, road surface detection, or the like.

The processor 170 may receive sensor information from the ECU 770 or the sensor unit 760 through the interface unit 130. The sensor information may include at least one of vehicle direction information, vehicle position information (GPS information), vehicle angle information, vehicle speed information, vehicle acceleration information, vehicle inclination information, vehicle forwarding/backwarding information, battery information, fuel information, tire information, vehicle lamp information, vehicle internal temperature information, and vehicle internal humidity information.

The display 180 may display information about a distance calculated by the processor 170. Meanwhile, the display 180 may provide various user interfaces (UIs), and may include a touch sensor for enabling a touch input to a provided UI.

The display 180 may include a cluster or head up display (HUD) on a front surface inside the vehicle. If the display 180 is a HUD, a projection module for projecting an image onto a front glass of the vehicle 200 may be included in the display 180.

The audio output unit 185 outputs a sound to the outside based on an audio signal processed by the processor 170. For this purpose, the audio output unit 185 may include at least one speaker.

The power supply 190 may supply power required for operation of each component under the control of the processor 170. Particularly, the power supply 190 may receive power from a battery inside the vehicle.

Figure 5A:
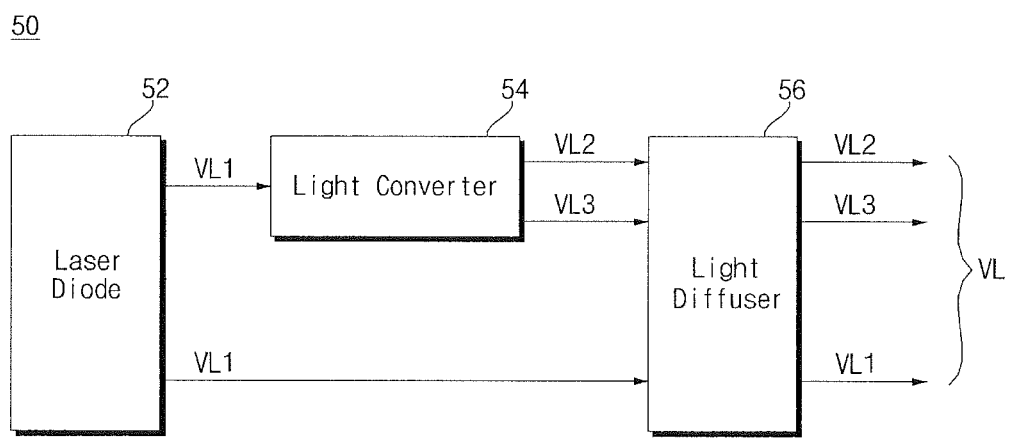
FIG. 5a is an exemplary interior block diagram of a first light output unit illustrated in FIG. 4.
Figure 5B:
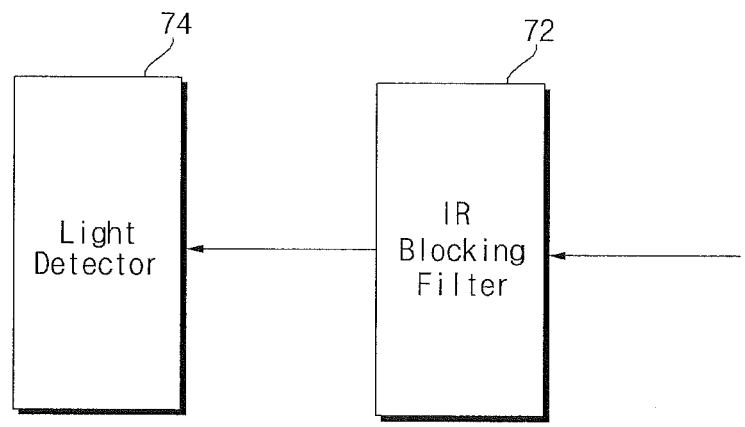
FIG. 5b is an exemplary interior block diagram of a light receiving unit illustrated in FIG. 4.

FIG. 5*a* is an exemplary interior block diagram of the first light output unit illustrated in FIG. 4, and FIG. 5*b* is an exemplary interior block diagram of the light receiving unit illustrated in FIG. 4.

Referring to FIG. 5*a*, the first light output unit 50 may include the laser diode 52 for outputting structured visible light VL1 of a first color, the light converter 54 for converting at least part of the structured visible light VL1 of the first color to structured visible light VL2 and VL3 of second and third colors, and the light diffuser 56 for diffusing the structured visible light VL1, VL2, and VL3 of the first, second, and third colors ahead of the vehicle.

The light converter 54 may include a first phosphor to convert the structured visible light of the first color to the structured visible light of the second color, and a second phosphor to convert the structured visible light of the first color to the structured visible light of the third color.

For example, if the laser diode 52 is a blue laser diode to output blue light VL1, the light converter 54 may include a red phosphor and a green phosphor to convert the blue light to red light and green light, respectively.

Figure 6:
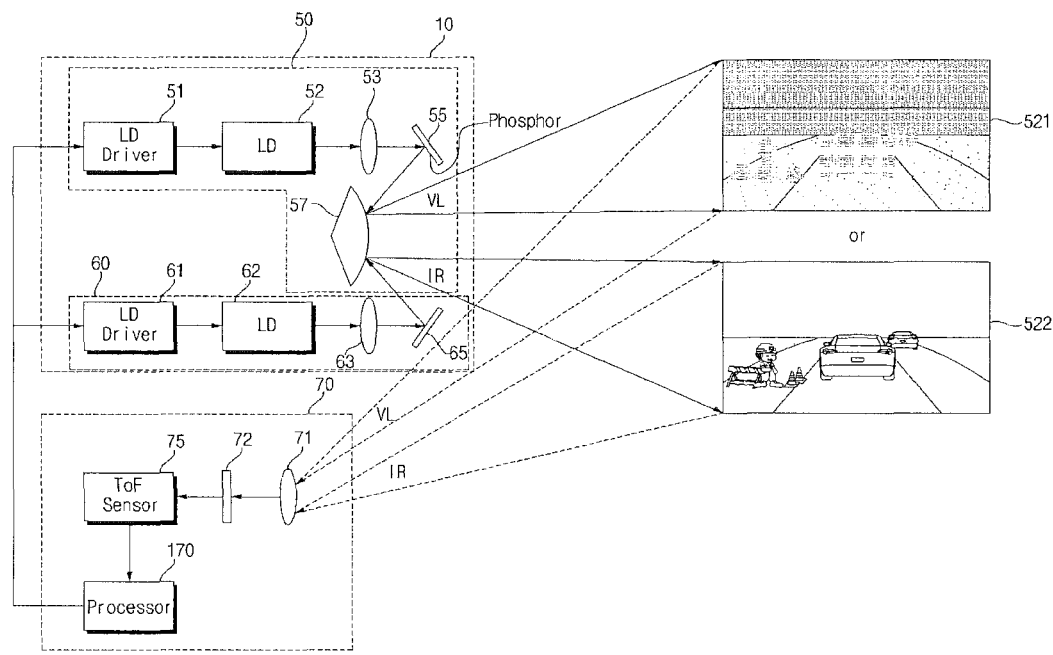
FIG. 6 is an exemplary view illustrating light output of first and second light output units, and light reception of a light receiving unit.

Meanwhile, the light converter 54 may further include a mirror (55 in FIG. 6) for changing an optical path of the structured visible light of the first color, and the first and second phosphors may be coated on the mirror (55 in FIG. 6).

For example, the light converter 54 may further include the mirror (55 in FIG. 6) for changing an optical path of the blue structured visible light, and the red and green phosphors may further be coated on the mirror (55 in FIG. 6).

Referring to FIG. 5*b*, the light receiving unit 70 may include the IR blocking filter 72, and the light detector 74 for converting reception light passed through from the IR blocking filter 72 to an electrical signal. The electrical signal converted by the light detector 74 may be input to the processor 170.

Meanwhile, the IR blocking filter 72 may be optional, for blocking IR light. For example, the IR blocking filter 72 may operate only at night, not in the daytime, thereby blocking IR light at night, not in the daytime.

Unlike the drawing, different optical reception paths may be defined for the night and the daytime. That is, reception light corresponding to IR light may be received directly at the light detector 74 without passing through the IR blocking filter 72 in the daytime.

FIG. 6 is an exemplary view illustrating light output from the first and second light output units, and light reception at the light receiving unit.

Referring to FIG. 6, the first light output unit 50 may include the laser diode driver 51, the laser diode 52, a collimator lens (CL) 53, the mirror 55, and the scanner 57.

The laser diode driver 51 may control operation of the laser diode 52 for outputting blue structured light, based on a first driving signal received from the processor 170. Particularly, the laser diode driver 51 may adjust the intensity of the blue structured light according to the level, pulse width, or the like of the first driving signal.

The blue light output from the laser diode 52 is incident on the mirror 55 through the CL 53, and output as green light and red light by means of the green and red phosphors coated on the mirror 55.

The mirror 55 transfers structured visible light VL including the blue light, the green light, and the red light toward the scanner 57 by changing the optical path of the structured blue light.

The scanner 57 outputs the structured visible light received from the mirror 55 to the outside by performing first-direction scanning and second-direction scanning on the structured visible light.

Particularly, the scanner 57 may output the structured visible light VL ahead of the vehicle as indicated by reference numeral 521, during traveling of the vehicle at night.

The processor 170 may control the scanner 57. Specifically, the processor 170 may control the angle of the first-direction scanning or the second-direction scanning of the scanner 57. The output direction of the structured visible light may be changed by the controlled scanning angle.

The processor 170 may further change a scanning frequency of the scanner 57. If the scanning frequency is decreased from 60 Hz to 30 Hz, scanning may be performed for the same external area with an increased resolution. Therefore, more detailed distance information may be acquired.

The second light output unit 60 may include a laser diode driver 61, the laser diode 62, a CL 63, and a mirror 65.

The laser diode driver 61 may control operation of the laser diode 62 for outputting red light or red structured light, based on a second driving signal received from the processor 170. Particularly, the laser diode driver 61 may adjust the intensity of the red light or the red structured light according to the level, pulse width, or the like of the second driving signal.

The red light output from the laser diode 62 is incident on the mirror 65 through the CL 63, and the mirror 65 transfers the IR light or structured IR light toward the scanner 57 by changing the optical path of the IR light or the structured IR light.

The scanner 57 outputs the IR light or structured IR light received from the mirror 65 to the outside by performing first-direction scanning and second-direction scanning.

Particularly, the scanner 57 may output the IR light or structured IR light, IR ahead of the vehicle as indicated by reference numeral 522, during traveling of the vehicle in the daytime.

The light receiving unit 70 may receive the first reception light VL corresponding to the structured visible light or the second reception light IR corresponding to the IR light.

The light receiving unit 70 may include a CL 71 for receiving and collimating reception light, the IR blocking filter 72, and a time of flight (TOF) sensor 75 as an example of the light detector 74 for converting reception light passed through the IR blocking filter 72 to an electrical signal. The electrical signal converted by the TOF sensor 75 may be input to the processor 170.

Meanwhile, the IR blocking filter 72 may be optional, for blocking IR light. For example, the IR blocking filter 72 may operate only at night, not in the daytime, thereby blocking IR light at night, not in the daytime.

Unlike the drawing, different optical reception paths may be defined for the night and the daytime. That is, reception light corresponding to IR light may be received directly at the TOF sensor 75 without passing through the IR blocking filter 72 in the daytime.

Figure 7A:
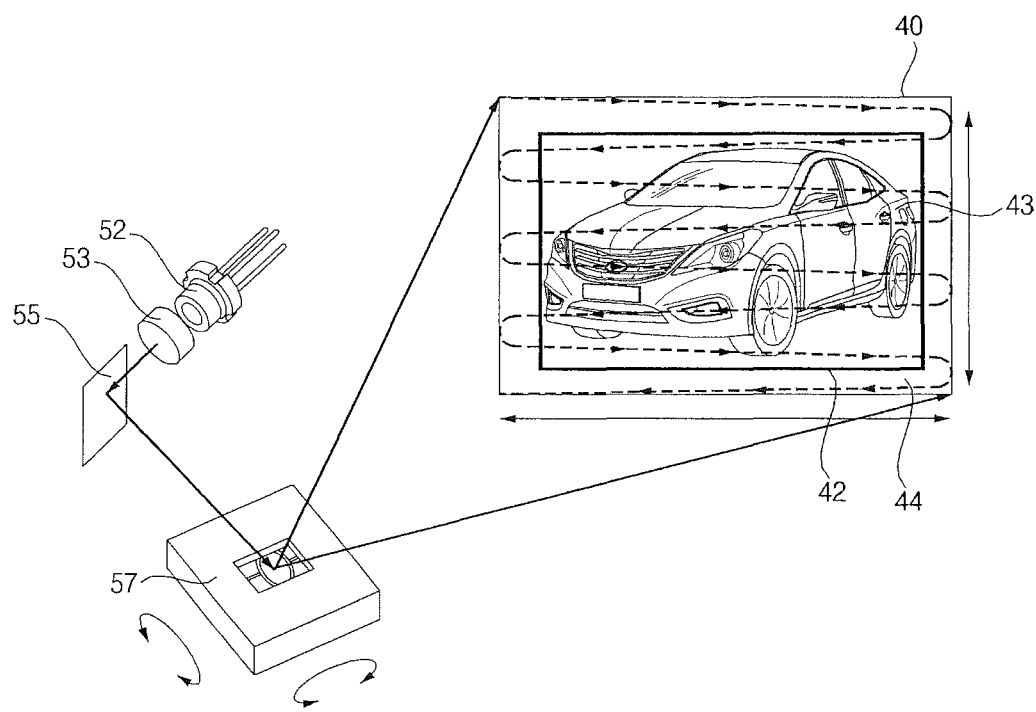
FIG. 7a is an exemplary view illustrating a scanning method during light projection of the first light output unit illustrated in FIG. 6.

FIG. 7*a* is an exemplary view illustrating a scanning method during light projection of the first light output unit illustrated in FIG. 6.

Referring to FIG. 7*a*, the first light output unit 50 may include the laser diode 52, the mirror 55, and the scanner 57.

A light wavelength output from the first light output unit 50 may be a single wavelength from a single light source. Particularly, the light wavelength may be that of blue light.

The blue light output from the laser diode 52 may be reflected and scattered by the mirror 55 and output as visible light including blue light, red light, and green light. The visible light VL may be incident on the scanner 57.

The scanner 57 may receive the structured visible light VL from the mirror 55 and perform first-direction scanning and second-direction scanning to the outside, sequentially and repeatedly.

As illustrated in FIG. 7*a*, the scanner 57 may scan a scannable area, for example, an external area 40 horizontally from left to light, vertically from top to down, horizontally again from left to light, and vertically again from top to down. The scanner 57 may repeatedly perform this scanning operation across the entire external area 40.

Or the scanner 57 may scan a scannable area, for example, the external area 40 in a diagonal direction from left to light and from right to left. The scanner 57 may repeatedly perform this scanning operation across the entire external area 40.

The visible light VL output to the external area 40 may be scattered or reflected from the external area 40 and then incident on the light receiving unit 70. For example, the scanner 57 may receive reception light corresponding to the visible light VL output to the outside.

The processor 170 may compare the structured visible light VL with the reception light corresponding to the structured visible light VL, and calculate a distance using the difference between the structured visible light VL and the reception light. While there are many available distance detection methods, a distance detection method based on a phase difference is used by way of example, in an embodiment of the present disclosure, which will be described with reference to FIG. 7b.

Figure 8A:
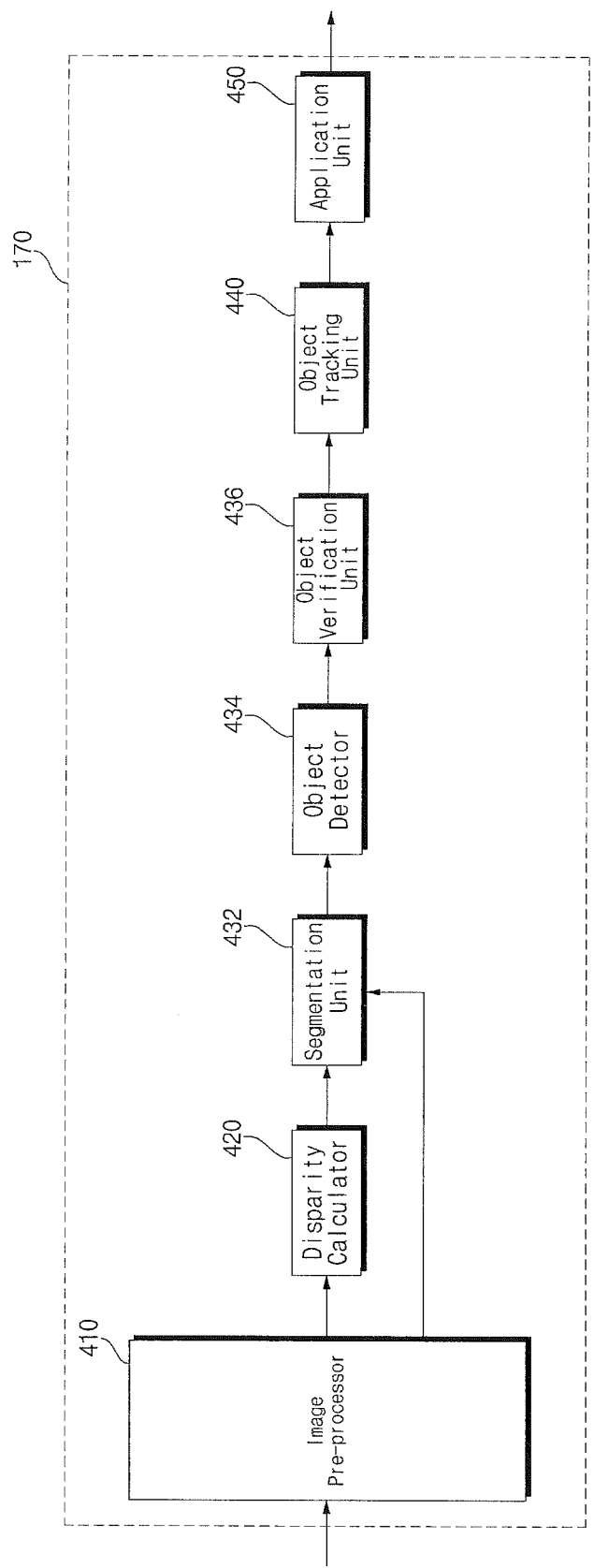
FIG. 8a is an exemplary interior block diagram of a processor illustrated in FIG. 4.
Figure 8B:
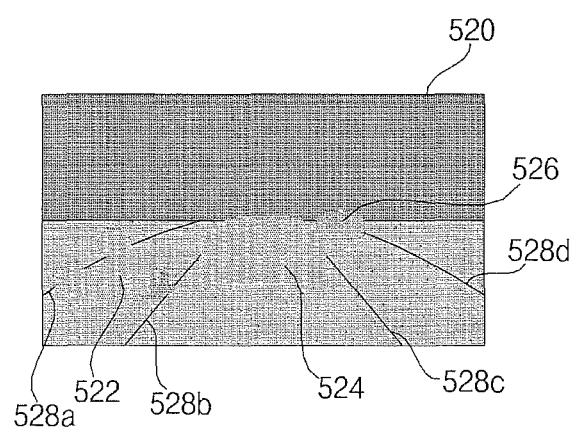

Information about a distance calculated in the first light output unit 50 may be represented as a luminance image as illustrated in FIG. 8b. Various distance values of external objects may be expressed as their corresponding luminance levels. As a distance is smaller, a luminance level may be larger (it may be brighter), and as a depth is larger, a luminance level may be smaller (it may be darker).

As illustrated in FIG. 7a, the external area 40 may be divided into a first area 42 and a second area 44. The first area 42 may be an area including an external object 43, that is, an active area 42, and the second area 44 may be an area without the external object 43, that is, a blank area 44.

Accordingly, a whole scanning zone may be divided into a first scanning zone corresponding to the active area with an external object and a second scanning zone corresponding to the blank area 44 without an external object.

Figure 7B:
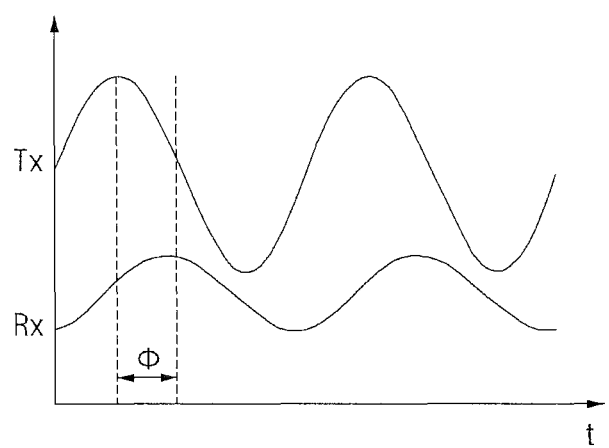
FIG. 7b is a view referred to for describing a distance detection method in an apparatus for driving a vehicle head lamp illustrated in FIG. 6.

FIG. 7b is a view referred to for describing a distance detection method in the apparatus for driving a vehicle head lamp illustrated in FIG. 6.

In FIG. 7b, Tx represents a phase signal of output visible light, and Rx represents a phase signal of reception light.

Referring to FIG. 7b, the processor 170 in the apparatus 100 for driving a vehicle lamp may calculate a distance information level according to the phase difference ϕ between the phase signal of the output visible light and the phase signal of the reception light.

For example, as the phase difference is larger, an external object is farther. Thus, the distance information level may be set to a large value. On the other hand, as the phase difference is smaller, the external object is nearer. Thus, the distance information level may be set to a small value.

A distance level may be set for each area of the external area 40, during horizontal scanning and vertical scanning of the external area 40 as described before. It is possible to detect a distance information level for each area of the external area 40.

FIG. 8a is an exemplary interior block diagram of the processor illustrated in FIG. 4, and FIG. 8b is an exemplary view illustrating object detection in the processor illustrated in FIG. 8a.

Referring to FIG. 8a being an exemplary interior block diagram of the processor 170, the processor 170 in the apparatus 100 for driving a vehicle head lamp may include an image pre-processor 410, a disparity calculator 420, an object detector 434, an object tracking unit 440, and an application unit 450.

The image preprocessor 410 may receive a driving signal corresponding to output visible light and a driving signal corresponding to reception light, and pre-process the driving signals.

Specifically, the image pre-processor 410 may perform noise reduction, rectification, calibration, interpolation, and the like on the driving signal corresponding to the output visible light and the driving signal corresponding to the reception light.

The disparity calculator 420 may receive the driving signal corresponding to the visible light which has been processed in the image pre-processor 410 and the driving signal corresponding to the reception light which has been processed in the image pre-processor 410, calculate distance information based on the phase difference between the driving signals, and acquire a disparity map of the external area 40 based on the distance information. That is, the disparity calculator 420 may acquire disparity information about the surroundings of the vehicle.

Ae segmentation unit 432 may segment or cluster the disparity map based on the disparity information received from the disparity calculator 420.

Specifically, the segmentation unit 432 may separate a background and a foreground from the disparity map based on the disparity information.

For example, the segmentation unit 432 may calculate an area having disparity information equal to or less than a precalculated value as the background and exclude the area. As a result, the foreground may be separated relatively.

In another example, the segmentation unit 432 may calculate an area having disparity information equal to or greater than the precalculated value as the foreground and extract the area. As a result, the foreground may be separated.

In this manner, since the foreground and the background are separated based on the extracted disparity information, a signal processing speed, a signal processing amount, and so on may be reduced during subsequent object detection.

Then, the object detector 434 may detect an object based on the segments from the segmentation unit 432.

That is, the object detector 434 may detect an object from the disparity map based on the disparity information.

Specifically, the object detector 434 may detect an object from the foreground separated by segmentation.

Subsequently, an object verification unit 436 classifies and verifies the detected object.

For this purpose, the object verification unit 436 may use a neural network-based verification scheme, a support vector machine (SVM) scheme, a Haar-like based AdaBoost verification scheme, a histograms of oriented gradients (HOG) scheme, or the like.

Meanwhile, the object verification unit 436 may verify the object by comparing the detected object with objects stored in the memory 140.

For example, the object verification unit 436 may verify adjacent vehicles, lanes, a road surface, a sign board, a dangerous region, a tunnel, and so on in the vicinity of the vehicle.

The object tracking unit 440 tracks the verified object. For example, the object tracking unit 440 may verify an object in sequentially acquired images, calculate a motion or motion vector of the verified object, and track movement of the object based on the calculated motion or motion vector. Accordingly, the adjacent vehicles, the lanes, the road surface, the sign board, the dangerous region, the tunnel, and so on in the vicinity of the vehicle may be tracked.

FIG. 8b is a view referred to for describing an operation method of the processor 170 illustrated in FIG. 8b based on a disparity map.

Referring to FIG. 8b, the disparity calculator 420 of the processor 170 may receive a driving signal corresponding to visible light which has been processed in the image preprocessor 410 and a driving signal corresponding to reception light which has been processed in the image preprocessor 410, calculate distance information based on the phase difference between the driving signals, and acquire a disparity map 520 of the external area 40 based on the distance information. That is, the disparity calculator 420 may acquire disparity information about the surroundings of the vehicle.

The disparity map 520 is a representation of distance information as levels. As a disparity level is greater, a distance to the vehicle is smaller, and as the disparity level is smaller, the distance to the vehicle is greater.

If the disparity map is to be displayed, the disparity map may be displayed in such a manner that a luminance is higher for a greater disparity level and lower for a smaller disparity level.

In FIG. 8b, first to fourth lanes 528a, 528b, 528c, and 528d have their corresponding disparity levels, and a construction site 522, a first preceding vehicle 524, and a second preceding vehicle 526 have their corresponding disparity levels on the disparity map 520.

The segmentation unit 432, the object detector 434, and the object verification unit 436 perform segmentation, object detection, and object verification on the disparity map 520, respectively.

In FIG. 8b, an object is detected and verified using the disparity map 520.

Meanwhile, the object tracking unit 440 may track the verified object by continuously acquiring images.

Figure 9:
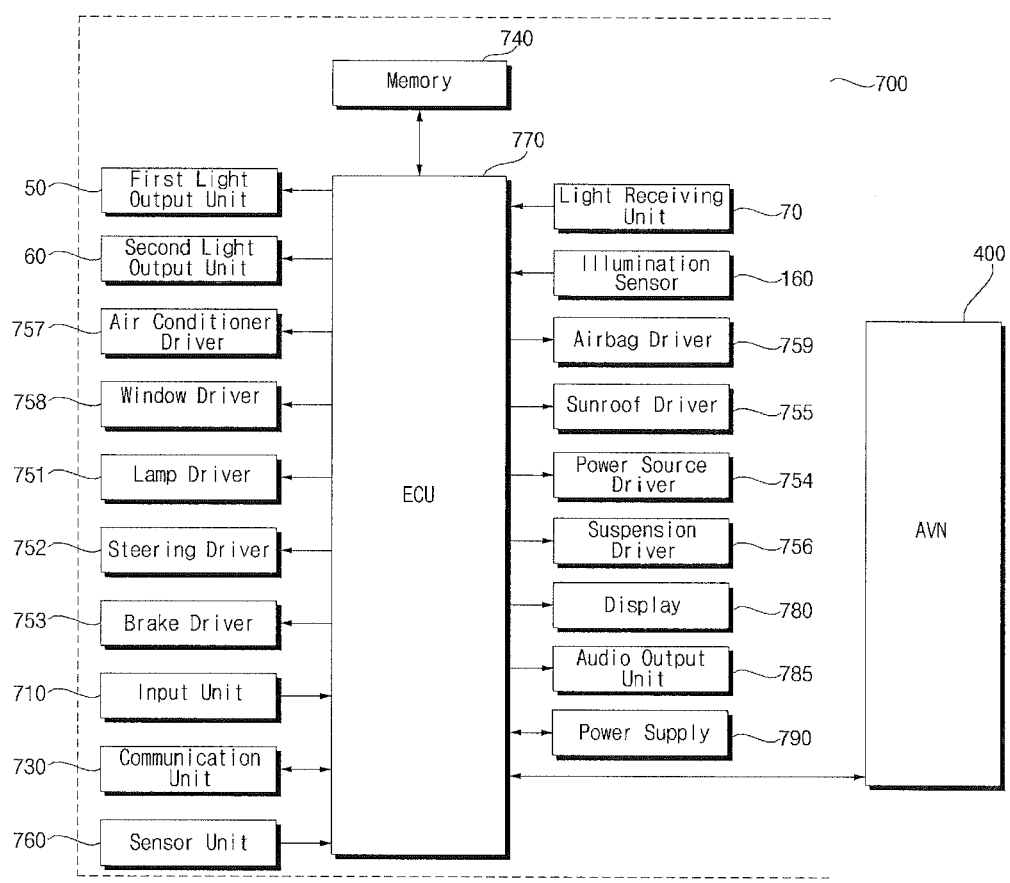
FIG. 9 is an exemplary interior block diagram of a vehicle according to an embodiment of the present disclosure.

FIG. 9 is an exemplary interior block diagram of a vehicle according to an embodiment of the present disclosure.

Referring to FIG. 9, the vehicle 200 may include an electronic controller 700. The electronic controller 700 may exchange data with the AVN 400.

The electronic controller 700 may include the first light output unit 50, the second light output unit 60, the light receiving unit 70, the illumination sensor 160, an input unit 710, a communication unit 720, a memory 740, a lamp driver 751, a steering driver 752, a brake driver 753, a power source driver 754, a sunroof driver 755, a suspension driver 756, an air conditioner driver 757, a window driver 758, an airbag driver 759, a sensor unit 760, an ECU 770, a display 780, an audio output unit 785, and a power supply 790.

The first light output unit 50, the second light output unit 60, the light receiving unit 70, and the illumination sensor 160 have been described before with reference to FIGS. 1 to 8b and thus will not be described herein.

The ECU 770 may incorporate a processor in concept.

The input unit 710 may include a plurality of buttons or a touch screen inside the vehicle 200. Various input operations may be performed by means of the plurality of buttons or the touch screen.

The communication unit 720 may exchange data wirelessly with the mobile terminal 600 or the server 500. Particularly, the communication unit 720 may wirelessly exchange data with a mobile terminal of the vehicle driver. For the wireless data communication, various communication schemes such as Bluetooth, WiFi Direct, WiFi, or APiX are available.

The communication unit 720 may receive weather information and traffic information about a road, for example, TPEG information from the mobile terminal 600 or the server 500.

Meanwhile, if the user is aboard on the vehicle, the mobile terminal 600 of the user and the electronic controller 700 may be paired with each other, automatically or upon user execution of an application.

The communication unit 720 may receive a light output unit operation signal for outputting structured visible light, or a signal for setting at least one of an output direction, output distance, and output intensity of the structured visible light. The received signal may be provided to the ECU 770.

The memory 740 may store various data for overall operations of the electronic controller 700, such as programs for processing and controlling in the ECU 770.

The lamp driver 751 may control turn-on/turn-off of lamps inside and outside the vehicle. Further, the lamp driver 751 may control a light intensity, direction, and so on of a lamp. For example, the lamp driver 751 may control a turn signal lamp, a brake lamp, and so on.

The steering driver 752 may perform electronic control on a steering apparatus (not shown) in the vehicle 200. Thus, the steering driver 752 may change a traveling direction of the vehicle 200.

The brake driver 753 may perform electronic control on a brake apparatus (not shown) in the vehicle 200. For example, the brake driver 753 may decrease the speed of the vehicle 200 by controlling an operation of a brake disposed at a tire. In another example, the traveling direction of the vehicle 200 may be adjusted to the left or right by differentiating operations of brakes disposed respectively at left and right tires.

The power source driver 754 may perform electronic control on a power source in the vehicle 200.

For example, if the power source is a fossil fuel-based engine (not shown), the power source driver 754 may perform electronic control on the engine. Thus, the power source driver 754 may control an output torque or the like of the engine.

In another example, if the power source is an electrical motor (not shown), the power source driver 754 may control the motor. Thus, the power source driver 754 may control a revolution speed, torque, or the like of the motor.

The sunroof driver 755 may perform electronic control on a sunroof apparatus (not shown) in the vehicle 200. For example, the sunroof driver 755 may control opening or closing of a sunroof.

The suspension driver 756 may perform electronic control on a suspension apparatus (not shown) in the vehicle 200. For example, if the surface of a road is rugged, the suspension driver 756 may control the suspension apparatus to reduce jerk of the vehicle 200.

The air conditioner driver 757 may perform electronic control on an air conditioner (not shown) in the vehicle 200. For example, if a vehicle internal temperature is high, the air conditioner may be controlled to operate and supply cool air into the vehicle 200.

The window driver 758 may perform electronic control on a window apparatus in the vehicle 200. For example, opening and closing of left and right side windows of the vehicle 200 may be controlled.

The airbag driver 759 may perform electronic control on an airbag apparatus in the vehicle 200. For example, the airbag driver 759 may control inflation of an airbag in an emergency situation.

The sensor unit 760 senses a signal related to traveling of the vehicle 100, or the like. For this purpose, the sensor unit 760 may include a heading sensor, a yaw sensor, a gyro sensor, a position module, a vehicle forwarding/backwarding sensor, a wheel sensor, a vehicle speed sensor, a vehicle body inclination sensor, a battery sensor, a fuel sensor, a tire sensor, a hand rotation-based steering sensor, a vehicle internal temperature sensor, a vehicle internal humidity sensor, and so on.

Thus, the sensor unit 760 may acquire sensing signals for vehicle heading information, vehicle position information (GPS information), vehicle angle information, vehicle speed information, vehicle acceleration information, vehicle inclination information, vehicle forwarding/backwarding information, battery information, fuel information, tire information, vehicle lamp information, vehicle internal temperature information, vehicle internal humidity information, and so on.

Meanwhile, the sensor unit 760 may further include an accelerator pedal sensor, a pressure sensor, an engine revolution sensor, an engine speed sensor, an air flow sensor (AFS), an air temperature sensor (ATS), a water temperature sensor (WTS), a throttle position sensor (TPS), a top dead center (TDC) sensor, a crank angle sensor (CAS), and so on.

The ECU 770 may provide overall control to each unit of the electronic controller 700.

The ECU 770 may perform a specific operation according to an input received through the input unit 710, transmit a sensing signal received from the sensor unit 760 to the apparatus 100 for driving a vehicle head lamp, receive map information from the AVN 400, and control operations of the drivers 751, 752, 753, 754, and 756.

The ECU 770 may receive weather information and traffic information about a road such as TPEG information from the communication unit 720.

Meanwhile, the ECU 770 may execute all of the functions of the processor 170 in the apparatus 100 for driving a vehicle head lamp, described with reference to FIGS. 1 to 8b, which will not be described herein.

The display 780 may display information about a calculated distance to an object ahead of the vehicle. Particularly, the display 780 may provide many other UIs.

To display the distance information, the display 780 may include a cluster or HUD on the front inside the vehicle. If the display 780 is a HUD, the display 780 may include a projection module for projecting an image onto the front glass of the vehicle 200. Meanwhile, the display 780 may include a touch screen on which an input may be applied.

The audio output unit 785 may convert an electrical signal received from the ECU 770 to an audio signal and output the audio signal. For this purpose, the audio output unit 785 may output a sound corresponding to an operation of the input unit 710, that is, a button.

The power supply 790 may supply power needed for operating each component under the control of the ECU 770. Particularly, the power supply 790 may receive power from a battery (not shown) within the vehicle 200.

Figures 10A, 10B:
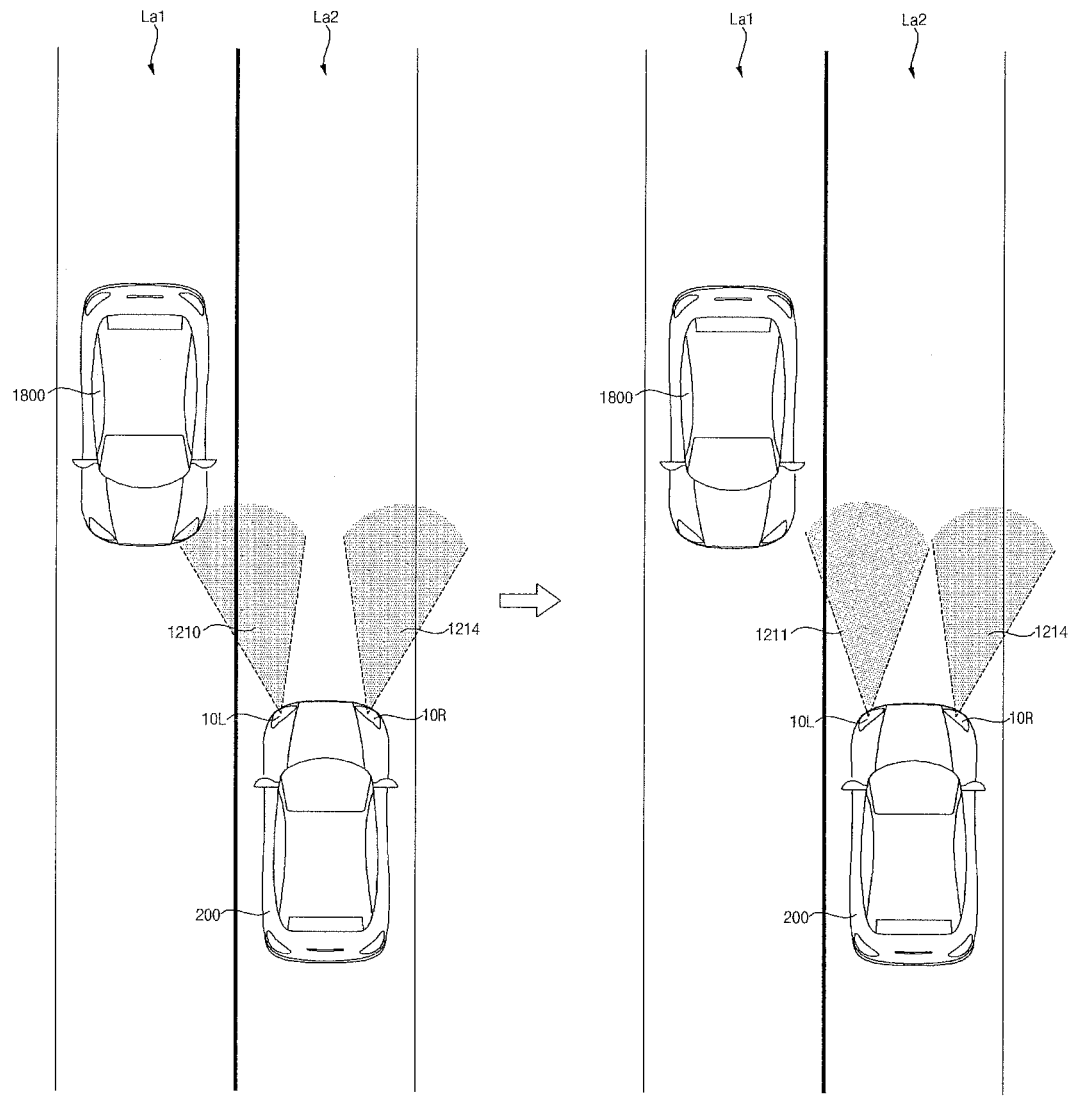
FIGS. 10, 11, and 12 are views referred to for describing a method for operating an apparatus for driving a vehicle head lamp.
Figures 11A, 11B:
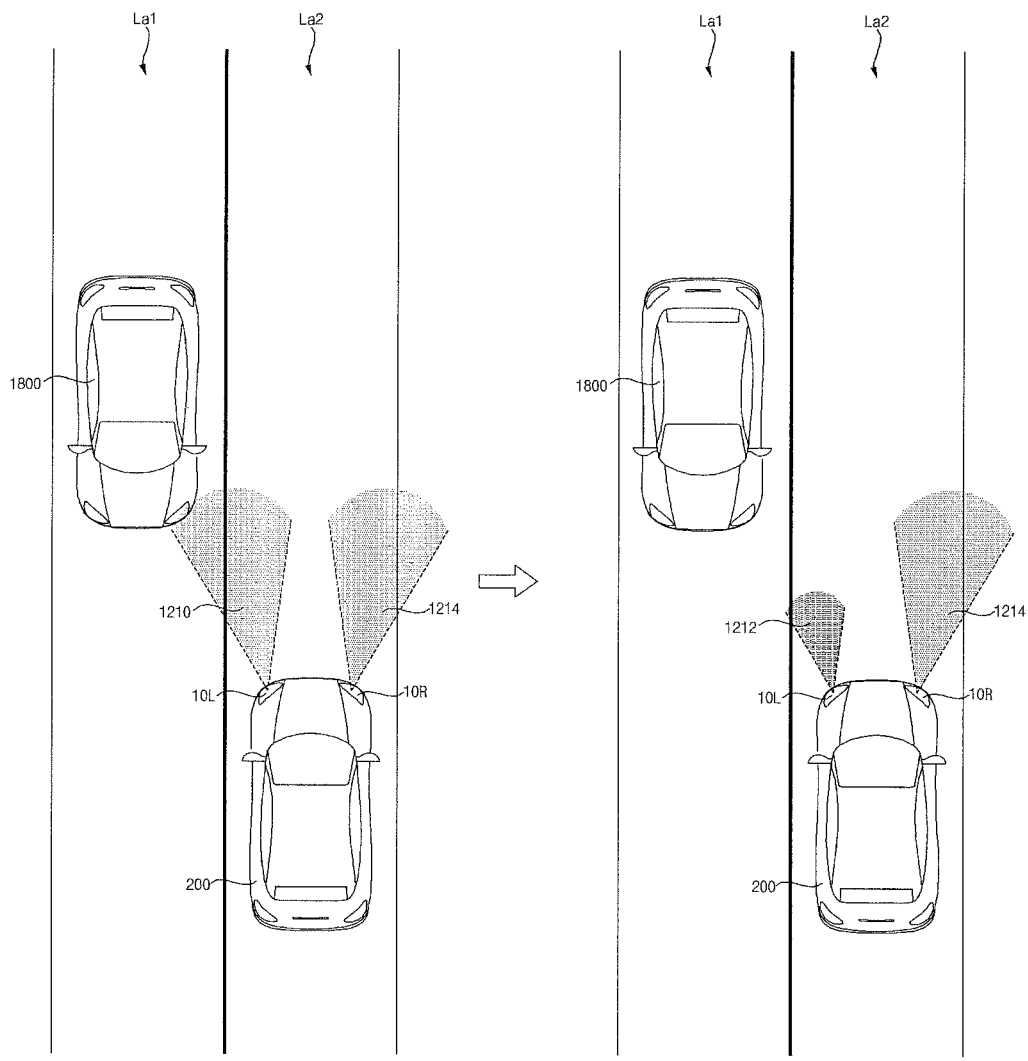
Figure 12A:
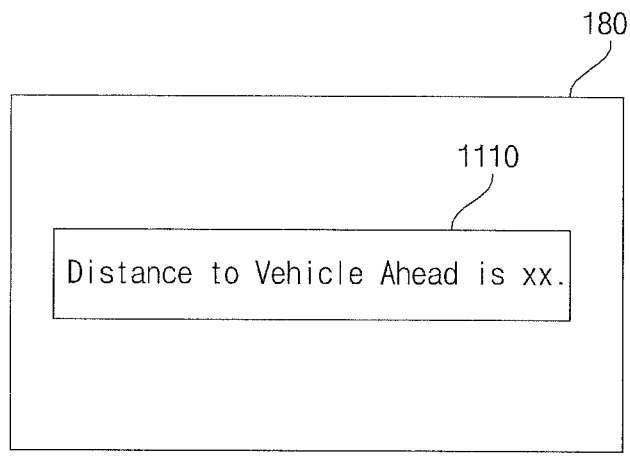
Figure 12A:
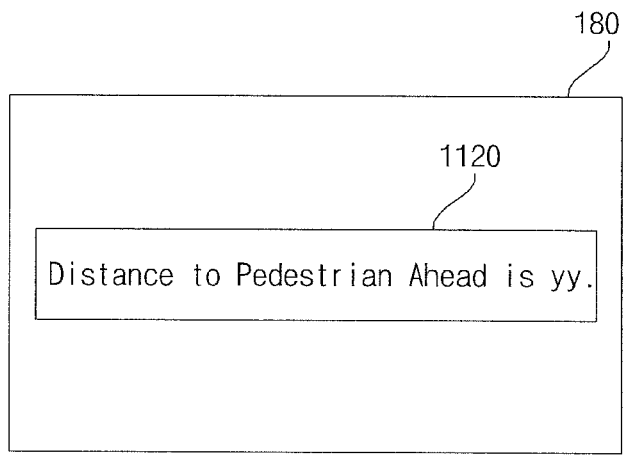

FIGS. 10, 11, and 12 are views referred to for describing a method for operating an apparatus for driving a vehicle head lamp.

FIG. 10 illustrates an example in which the head lamps 10L and 10R output first visible light 1210 and second visible light 1214 and the direction of the first visible light 1210 is changed, during traveling of the vehicle 200 at night.

The first light output unit 50 outputs structured visible light and the light receiving unit 70 receives reception light corresponding to the visible light, at night in the apparatus 100 for driving a vehicle head lamp.

As illustrated in FIG. 10, if a vehicle 1800 is traveling down in a lane La1 opposite to a lane La2 in which the vehicle 200 is traveling, the processor 170 may calculate that there is an external structure in the opposite lane La1 based on the phase difference between the output visible light and the received reception light in the apparatus 100 for driving a vehicle head lamp. That is, the processor 170 may calculate the distance to the opposite vehicle 1800. As described before, since the opposite vehicle 1800 is coming sequentially, the vehicle 1800 may be tracked.

Meanwhile, the processor 170 may control change of the output direction of the visible light so that the driver of the vehicle 1800 in the opposite lane La1 may not be dazzled by the visible light output from the vehicle 200.

Specifically, the processor 170 may control the output visible light not to be directed to the opposite vehicle, that is, to be steered to the right by controlling at least one of a first-direction scanning angle and a second-direction scanning angle. Therefore, the driver of the opposite vehicle 1800 may be protected.

FIG. 11 illustrates an example in which the head lamps 10L and 10R output the first visible light 1210 and the second visible light 1214 and the intensity of the first visible light 1210 is changed, during traveling of the vehicle 200 at night.

FIG. 11 is similar to FIG. 10 but different from FIG. 10 in that an intensity or propagation distance of visible light is changed.

The processor 170 may control change of the output intensity or distance of visible light so that the driver of the vehicle 1800 in the opposite lane La1 may not be dazzled by the visible light output from the vehicle 200.

Specifically, the processor 170 may control the visible light not to have an intensity or a propagation distance allowing the visible light to be directed to the opposite vehicle by controlling at least one of a level and pulse width of a driving signal applied to the laser diode driver 51 of left head lamp 10L. Therefore, the driver of the opposite vehicle 1800 may be protected.

Unlike FIG. 11, the processor 170 may change at least one of the output direction, distance, and intensity of structured visible light output from the light output unit 50 based on a steering direction change signal of the vehicle.

Or the processor 170 may change at least one of the output direction, distance, and intensity of the structured visible light output from the light output unit 50 based on an illuminance sensed by the illumination sensor 160 configured to sense an ambient illuminance of the vehicle.

FIG. 12 illustrates an example in which distance information calculated by the processor 170 is displayed on the display 180 in the apparatus 100 for driving a vehicle head lamp.

FIG. 12a illustrates an example in which distance information 1110 about a preceding vehicle is displayed on the display 180, and FIG. 12b illustrates an example in which distance information 1120 about a preceding pedestrian is displayed on the display 180.

Therefore, the user may immediately recognize distance information about a preceding object.

The apparatus for driving a vehicle head lamp and the method for operating a vehicle according to the present disclosure may be implemented as code that can be written on a processor-readable recording medium and thus read by the processor in the apparatus for driving a vehicle head lamp or a vehicle. The processor-readable recording medium may be any type of recording device in which data is stored in a processor-readable manner. Examples of the processor-readable recording medium include a read only memory (ROM), a random access memory (RAM), a compact disk ROM (CD-ROM), a magnetic tape, a floppy disc, an optical data storage, and a carrier wave such as data transmission over the Internet. Further, the processor-readable recording medium may be distributed across computer systems connected through a network, and store and execute processor-readable code in a distributed manner.

While preferred embodiments of the present disclosure have been described and illustrated above, the present disclosure is not limited to the foregoing specific embodiments. Therefore, those skilled in the art will understand that many modifications can be made without departing from the scope and spirit of the present disclosure claimed by the appended claims, and these modifications should not be understood individually from the technical spirit or perspective of the present disclosure.

INDUSTRIAL APPLICABILITY

The present disclosure is applicable to an apparatus for driving a vehicle head lamp and a vehicle having the same, and more particularly, to an apparatus for driving a vehicle head lamp and a vehicle having the same, which can calculate a distance to an object ahead of the vehicle based on visible light.

The invention claimed is:

1. An apparatus for driving a vehicle head lamp, the apparatus comprising:
   a light output unit to output structured visible light ahead of a vehicle;
   a light receiving unit to receive reception light corresponding to the structured visible light; and
   a processor to calculate a distance and position of an object ahead of the vehicle based on the received reception light and the structured visible light,
   wherein the light output unit comprises:
      a laser diode to output structured visible light of a first color;
      a light converter to convert at least part of the structured visible light of the first color to structured visible light of a second color and a third color; and
      a light diffuser to diffuse the structured visible light of the first, second, and third colors ahead of the vehicle,
   wherein the processor generates a disparity map for an area ahead of the vehicle based on a phase difference between the received reception light and the structured visible light, and calculates the distance and position of the object ahead of the vehicle based on the disparity map.

2. The apparatus according to claim 1, wherein the light converter comprises:
   a first phosphor to convert the structured visible light of the first color to the structured visible light of the second color; and
   a second phosphor to convert the structured visible light of the first color to the structured visible light of the third color.

3. The apparatus according to claim 1, wherein the light converter further comprises a mirror to change an optical path of the structured visible light of the first color, and
   wherein the first phosphor and the second phosphor are coated on the mirror.

4. The apparatus according to claim 1, wherein the light receiving unit comprises:
   an infrared blocking filter; and
   a light detector to convert the reception light passed through the infrared blocking filter to an electrical signal.

5. The apparatus according to claim 1, wherein the processor changes at least one of an output direction, an output intensity, and an output distance of the structured visible light of the light output unit based on the distance and position of the object ahead of the vehicle.

6. The apparatus according to claim 5, wherein the light output unit comprises a scanner to externally output the structured visible light by scanning, and
   wherein the processor changes the output direction of the structured visible light or the intensity of the structured visible light output from the light output unit by controlling a scanning direction of the scanner based on the distance and position of the object ahead of the vehicle.

7. The apparatus according to claim 1, further comprising an illumination sensor to sense an ambient illuminance of the vehicle, and
   wherein the processor changes an intensity of the structured visible light output from the light output unit based on the sensed illuminance.

8. The apparatus according to claim 1, wherein the processor changes at least one of an output direction, an output intensity, and an output distance of the structured visible light output from the light output unit based on a steering direction change signal of the vehicle.

9. An apparatus for driving a vehicle head lamp, the apparatus comprising:
   a communication unit to exchange data with an external device;
   a light output unit to output structured visible light ahead of a vehicle;
   a light receiving unit to receive reception light corresponding to the structured visible light; and
   a processor to calculate a distance and position of an object ahead of the vehicle based on the received reception light and the structured visible light,
   wherein the light output unit comprises:
      a laser diode to output structured visible light of a first color;
      a light converter to convert at least part of the structured visible light of the first color to structured visible light of a second color and a third color; and
      a light diffuser to diffuse the structured visible light of the first, second, and third colors ahead of the vehicle,
   wherein upon receipt of a light output unit operation signal through the communication unit, the processor outputs the structured visible light through the light output unit, or the processor sets at least one of an output direction, an output intensity, and an output distance of the structured visible light based on data received through the communication unit.

10. An apparatus for driving a vehicle head lamp, the apparatus comprising:
    a first light output unit to output structured visible light ahead of a vehicle;
    a second light output unit to output infrared light;
    a light receiving unit to receive first reception light corresponding to the structured visible light or second reception light corresponding to the infrared light; and
    a processor to calculate a distance and position of an object ahead of the vehicle based on the received first reception light and the structured visible light, or based on the received second reception light and the infrared light,
    wherein the processor changes at least one of an output direction, an output intensity, and an output distance of the structured visible light of the first light output unit or the infrared light of the second light output unit based on the distance and position of the object ahead of the vehicle, wherein the first light output unit comprises a scanner to externally output the structured visible light and the infrared light by scanning, and wherein the processor changes the output direction of at least one of the structured visible light and the infrared light or the intensity of the structured visible light output from the light output unit by controlling a scanning direction of the scanner based on the distance and position of the object ahead of the vehicle.

11. The apparatus according to claim 10, wherein the first light output unit comprises:
a laser diode to output structured visible light of a first color;
a light converter to convert at least part of the structured visible light of the first color to structured visible light of a second color and a third color; and
a light diffuser to diffuse the structured visible light of the first, second, and third colors ahead of the vehicle.

12. A vehicle comprising:
a steering driver to drive a steering apparatus;
a brake driver to drive a brake apparatus;
a power source driver to drive a power source;
a light output unit to output structured visible light ahead of the vehicle;
a light receiving unit to receive reception light corresponding to the structured visible light; and
a processor to calculate a distance and position of an object ahead of the vehicle based on the received reception light and the structured visible light,
wherein the light output unit comprises:
a laser diode to output structured visible light of a first color;
a light converter to convert at least part of the structured visible light of the first color to structured visible light of a second color and a third color; and
a light diffuser to diffuse the structured visible light of the first, second, and third colors ahead of the vehicle, wherein the processor changes at least one of an output direction, an output intensity, and an output distance of the structured visible light of the light output unit based on the distance and position of the object ahead of the vehicle, wherein the light output unit comprises a scanner to externally output the structured visible light by scanning, and wherein the processor changes the output direction of the structured visible light or the intensity of the structured visible light output from the light output unit by controlling a scanning direction of the scanner based on the distance and position of the object ahead of the vehicle.

13. The vehicle according to claim 12, wherein the light converter comprises:
a first phosphor to convert the structured visible light of the first color to the structured visible light of the second color; and
a second phosphor to convert the structured visible light of the first color to the structured visible light of the third color.

14. The vehicle according to claim 12, further comprising an illumination sensor to sense an ambient illuminance of the vehicle, and
wherein the processor changes an intensity of the structured visible light output from the light output unit based on the sensed illuminance.

15. The vehicle according to claim 12, wherein the processor changes at least one of an output direction, an output intensity, and an output distance of the structured visible light output from the light output unit based on a steering direction change signal received from the steering driver.

* * * * *